United States Patent [19]

Huber

[11] Patent Number: 4,721,952
[45] Date of Patent: Jan. 26, 1988

[54] APPARATUS AND PROCESS FOR GRAPHICALLY REPRESENTING THREE-DIMENSIONAL OBJECTS IN TWO-DIMENSIONS

[75] Inventor: Josef Huber, Engelsberg, Fed. Rep. of Germany

[73] Assignee: Dr. Johannes Heidenhain GmbH, Traunreut, Fed. Rep. of Germany

[21] Appl. No.: 688,605

[22] Filed: Jan. 3, 1985

[30] Foreign Application Priority Data

Feb. 3, 1984 [DE] Fed. Rep. of Germany ....... 3403678

[51] Int. Cl.$^4$ ............................................... G09G 1/00
[52] U.S. Cl. ...................................... 340/729; 340/706
[58] Field of Search ........................ 340/729, 722, 706

[56] References Cited

U.S. PATENT DOCUMENTS

| | | |
|---|---|---|
| 4,222,048 | 9/1980 | Johnson .............................. 340/722 |
| 4,490,781 | 12/1984 | Kishi et al. . |
| 4,509,043 | 4/1985 | Mossaides .......................... 340/729 |
| 4,521,860 | 6/1985 | Kanematsu et al. . |
| 4,530,046 | 7/1985 | Munekata et al. . |
| 4,556,833 | 12/1985 | Kishi et al. . |
| 4,558,438 | 12/1985 | Jones et al. . |

FOREIGN PATENT DOCUMENTS 0083836 7/1983 European Pat. Off. .
2738441 3/1979 Fed. Rep. of Germany .

*Primary Examiner*—Marshall M. Curtis
*Attorney, Agent, or Firm*—Willian Brinks Olds Hofer Gilson & Lione Ltd.

[57] ABSTRACT

A process for the perspective representation of objects on the picture screen of a numerically controlled machine tool is described in which the object is resolved into a series of sections which are represented successively with a given perspective offset. In order to avoid the representation of covered edges of these sections, the contours of the individual section surfaces are checked prior to being represented in order to determine whether or not they overlap a previously represented contour. This checking occurs through a simple coordinate comparison, taking into account the actual perspective shift between sections.

11 Claims, 4 Drawing Figures

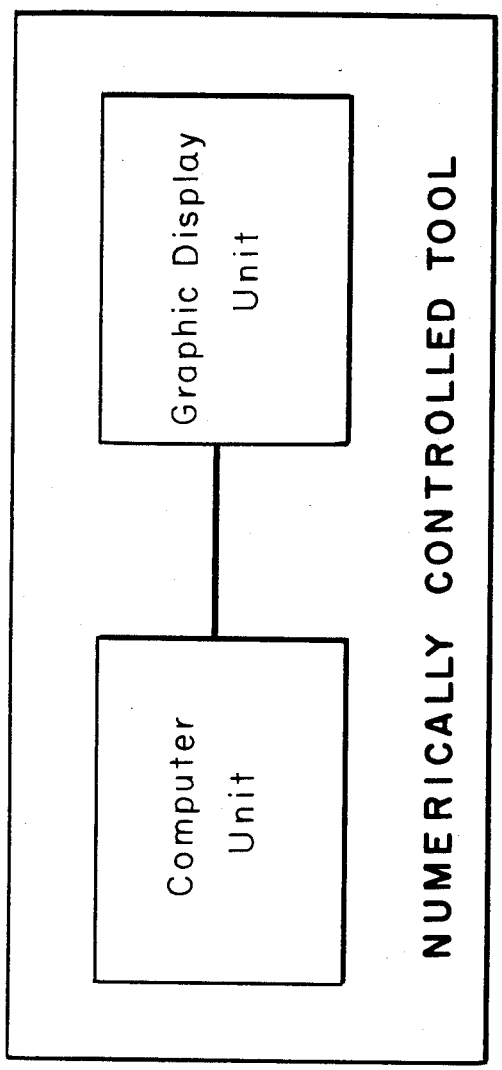

APPARATUS AND PROCESS FOR GRAPHICALLY REPRESENTING THREE-DIMENSIONAL OBJECTS IN TWO-DIMENSIONS

BACKGROUND OF THE INVENTION

This invention relates to a process for representing three-dimensional objects by means of data stored in a computer, which data define a plurality of parallel section surfaces of the object.

West German DE-OS No. 27 38 441 describes a process by which an object is resolved into a series of sections. These sections are offset and displayed, and calculations are performed to generate spatially allocated views in which edge lines in covered portions of the sections are eliminated by means of calculation. The spatial views are viewed in this disclosed system with a stereoscopic arrangement. No indication is given of the algorithm used to eliminate by calculation the covered edges.

In the field of computer-aided design (CAD) it is a known practice to represent objects in perspective form so that covered edges are not visible. However, as is well known, a high expenditure is necessary both in terms of apparatus and calculation to generate this type of representation.

Accordingly, the state of the art does not include a process in which a simple apparatus (for example, the picture screen of a numerically controlled machine tool) can be used to depict a perspective view of a three-dimensional object in such a way that covered edges are not visible. European Application No. EP-A2-0 083 836 discloses a system in a numerically controlled machine tool in which only the tool path is displayed. The expenditure and apparatus required for this is comparatively low.

SUMMARY OF THE INVENTION

The present invention is directed to an improved process for representing objects, which can be implemented with low expenditure and yet which nevertheless makes it possible to generate perspective representations in which covered edges are not shown. In this way, a clear spatial impression of the displayed object is achieved.

According to this invention, a process is provided for representing a three-dimensional object with data stored in a computer, which data define a plurality of parallel section surfaces of the object. This process includes the step of graphically representing a first one of the section surfaces on a display. Then only selected portions of the next one of the section surfaces are graphically represented, offset with respect to the previous section surface by a prescribed perspective offset. The portions of the next section surface selected for representation correspond to those parts of the next section surface which overhang one of the previously represented section surfaces, taking into account the perspective offset. This process is then continued with a plurality of additional section surfaces.

The process of this invention provides important advantages in that the data stored in the computer which define the object are evaluated in a remarkably simple manner, thereby allowing perspective representations of an object to be generated with extreme rapidity.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
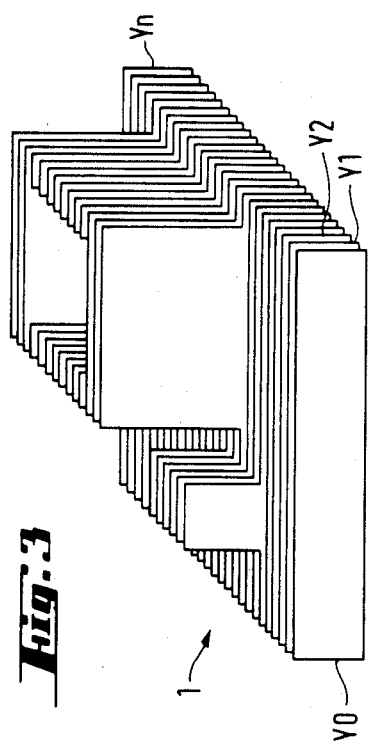
FIG. 1 is a front view of a workpiece that is to be represented on a picture screen.

Turning now to the drawings, FIG. 1 represents a workpiece 1 as it is typically shown in technical drawings. In FIG. 1 all of the visible edges are shown in accordance with conventional technical drawing standards with solid, continuous lines. All of the edges that are not visible in this front view are shown in thinner, broken lines, in the conventional manner.

The workpiece 1 of FIG. 1 represents an object that is to be produced on a numerically controlled machine tool. In order for it to be possible to produce this workpiece 1 from a blank, there must be set up in a known manner a program for the numerically controlled machine tool. The program is fed into the numerical control controller with the aid of a technical drawing of the finished workpiece 1 in the form of program data and commands.

In order to be able to find programming errors without making rejected workpieces, the workpiece 1 as it would arise from the blank according to the program is represented on the picture screen of the numerical control controller of the machine tool. Such a representation is most useful when it takes the form of a perspective representation in which concealed edges are not shown.

In this embodiment, this representation occurs in such a manner that the workpiece 1 is analyzed into a series of sections which are displayed shifted one respect to the other to create a perspective view.

Figure 2:
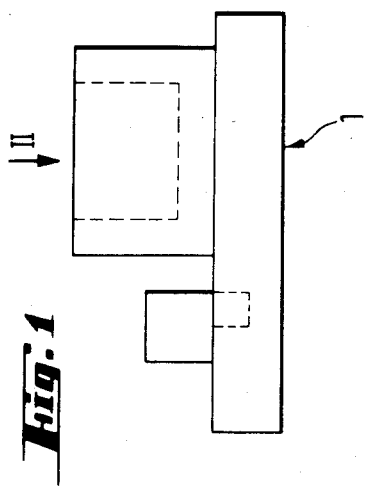
FIG. 2 is a plan view of the workpiece of FIG. 1 showing section markings.

FIG. 2 shows with the aid of a plan view of the workpiece 1 how the parallel sections $Y_0$–$Y_n$ are laid out. Through each of these sections $Y_0$–$Y_n$ there arises a respective section plane, the surface of which corresponds to the cross-section of the workpiece 1 in the particular section plane. The contour of each of these surfaces is a polygon, the coordinates of which are stored in the form of data in the controller memory.

Figure 3:
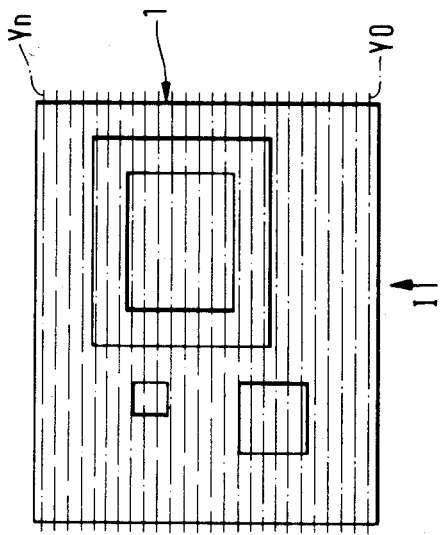
FIG. 3 is a perspective image which corresponds to the representation on the picture screen of the workpiece of FIG. 1.

FIG. 3 shows the completed, built-up representation of the workpiece 1 corresponding to a perspective image displayed on the picture screen of the numerical controller.

By the coordinate $Y_0$ it is established that the $Y_0$ section or polygon is present in the $Y_0$ plane. Further data give the extent of the polygon in the X direction (the width of the polygon) as well as the extent of the polygon in Z direction (the height of the polygon). The height of the polygon can vary within the range from the maximum height of the blank to zero, if all of the material in the blank is removed at any particular point.

The representation of the polygon at the next section plane occurs at the coordinate $Y_1$. The polygon at the section plane $Y_1$ should be represented shifted in perspective, in order to impart a spatial impression to the picture of the object.

Since, however, concealed edges are not to be displaced, the polygon of the next section plane $Y_1$ must be checked as to whether, taking consideration of the perspective shift, any part of the contour of the next polygon $Y_1$ extends beyond the contour of the previously represented polygon $Y_0$. Only if a portion of the contour of the next polygon $Y_1$ overhangs or extends beyond the contour of one of the previously represented polygons is that portion of the contour represented. Thus, it is assured that edges of a subsequently represented polygon are displayed only if they overhang at least one of the previously represented polygons.

A computer can be used to determine whether the contour of the next polygon overhangs one of the previously represented polygons, since this can be accomplished merely by comparing the coordinate values of the respective polygons, taking into account the actual perspective shift.

Figure 4:
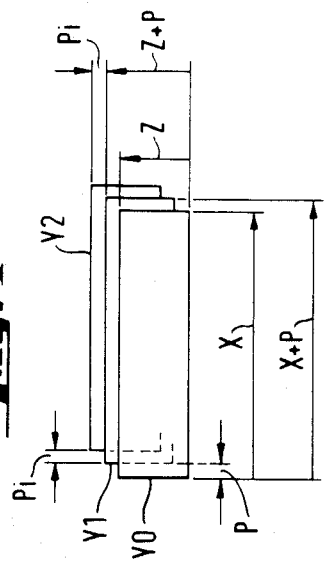
FIG. 4 is an example of the front three of the sections included in the perspective image of FIG. 3.

The simple example shown in FIG. 4 can be used to explain in greater detail the manner in which it is determined which contours are to be represented. In FIG. 4, a polygon $Y_0$ of the first section plane is shown. This polygon $Y_0$ has the width X in the X direction and the height Z in the Z direction. In order to provide an impression of spatial extent, the polygon $Y_1$ of the second section plane should be represented shifted by two picture elements in correspondence to the raster picture screen in both the X and Z directions.

In this example, the object in the second section plane $Y_1$ still has the width X and the height Z of the polygon $Y_0$. According to this invention, the second section plane $Y_1$ is represented in such a way that the perspective shift P is taken into account. The upper edge of the second polygon $Y_1$ is defined therefore by a Z coordinate equal to Z +P, an amount which is greater than the height Z of the first polygon $Y_0$. For this reason, the upper edge of the second section plane $Y_1$ is represented. Similarly, the right edge of the second polygon $Y_1$ has the coordinate X+P which is greater than X and is therefore also represented.

The left edge of the polygon $Y_1$ is represented only insofar as its height is greater than the height Z of the polygon $Y_0$ of the first section plane. Therefore, only the upper portion of the left edge of the polygon $Y_1$ extending for a distance equal to the perspective shift P is represented. Similarly, only the rightmost portion of the lower edge of the polygon $Y_1$ is represented.

The process described above for determining which of the edges are to be represented of the individual polygons can be executed so rapidly that it is easily implemented with even relatively simple microprocessor systems.

The determination of the data structure of the processed workpiece can be accomplished in a wide variety of ways and does not form an object of the present invention.

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. A process for controlling a display device to represent a three-dimensional object such as a workpiece wherein the representation is based upon data and commands stored in a computing device such as a computer, the computing device of the type comprising means for storing data and commands, a graphic processor responsive to the stored data and commands to generate graphic data representing the object, and a display means for the visible representation of the graphic data, the improvement comprising:
    generating coordinate data of the contours of a plurality of cross-sections through the object in dependence upon the stored data and commands, each contour defining a closed polygon, wherein the cross-sections are formed substantially parallel to one another and parallel to a plane defined by two coordinate axes of a three-dimensional coordinate system;
    adding a respective offset value to each of at least selected ones of a sequence of the contours of the object cross-sections such that the position of each contour is shifted along at least one of the two coordinate axes by a selected amount and comparing portions of each of the contours to determine the portions of each shifted contour which extend beyond preceding shifted contours; and
    displaying the sequence of contours such that only the portions of each shifted contour which extend beyond the contours of the preceding shifted contours are visibly represented.

2. In a numerical control device for controlling machine tools, the control device of the type comprising means for storing data and commands for the processing of an object, a program control means for controlling the processing of the object by the machine tool in response to the stored data and commands, and a graphic processor responsive to the stored data and commands to generate graphic data representing the object, the improvement comprising:
    means, associated with the program control means, for generating coordinate data of the contours of a plurality of cross-sections through the object in dependence upon the stored data and commands, each contour defining a closed polygon, wherein the cross-sections are formed substantially parallel to one another;
    means for adding a respective offset value to each of at least selected ones of a sequence of the contours of the object cross-sections such that the position of each contour is shifted along at least one of the two coordinate axes by a selected amount and comparing portions of each of the contours to determine the portion of each shifted contour which extend beyond preceding shifted contours; and
    means, associated with the graphic processor, for displaying the sequence of contours such that the only portions of each shifted contour extending beyond the contours of the preceding shifted contours are visibly represented.

3. The invention of claim 2 wherein the means for generating coordinate data comprises a microprocessor.

4. The invention of claim 2 wherein the object is processed by the numerically controlled tool in stages and cross-sections are generated and displayed in response to the stored data and commands at selectable stages of processing.

5. The invention of claim 2 wherein the control device comprises a display unit which defines a display plane; and wherein the workpiece cross-sections are represented as parallel to the display plane.

6. The invention of claim 2 wherein the contours are shifted with respect to one another by a common selected amount.

7. The invention of claim 2 wherein the portions of each shifted contour not extending beyond the contours of the preceding shifted contours are graphically represented in a manner visibly distinguishable from the portions of the respective shifted contour extending beyond the contours of the preceding shifted contours.

8. The invention of claim 2 wherein the selected respective amount and direction that each contour is shifted may be varied in a manner such that the graphical representation presents a desired representation of the workpiece.

9. The invention of claim 2 wherein selected contours may be graphically emphasized by the graphic processor.

10. The invention of claim 2 wherein the coordinate data are stored in the storage means.

11. The invention of claim 2 wherein the contours are shifted with respect to both coordinate axes.

* * * * *

UNITED STATES PATENT AND TRADEMARK OFFICE
CERTIFICATE OF CORRECTION

PATENT NO. : 4,721,952
DATED : January 26, 1988
INVENTOR(S) : Josef Huber

It is certified that error appears in the above-identified patent and that said Letters Patent is hereby corrected as shown below:

ON THE FACE OF THE PATENT APPLICATION

After the Abstract and before the drawings, please delete "11 Claims, 4 Drawing Figures" and substitute therefor --11 Claims, 5 Drawing Figures--.

IN THE DETAILED DESCRIPTION OF THE
PRESENTLY PREFERRED EMBODIMENTS

In column 2, line 62, please insert --a-- after "in" and before "Z".

In column 3, lines 3 and 4, please delete "displaced" and substitute therefor --displayed--.

Signed and Sealed this

Twenty-fourth Day of January, 1989

Attest:

DONALD J. QUIGG

Attesting Officer      Commissioner of Patents and Trademarks